United States Patent
Skog et al.

(10) Patent No.: US 10,887,944 B2
(45) Date of Patent: Jan. 5, 2021

(54) USER PLANE FUNCTION CONTROL OF CONTROL PLANE-USER PLANE SEPARATION

(71) Applicant: Telefonaktiebolaget LM Ericsson (publ), Stockholm (SE)

(72) Inventors: Robert Skog, Hässelby (SE); Marcus Ihlar, Älvsjö (SE); Ala Nazari, Handen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/999,493

(22) Filed: Aug. 20, 2018

(65) Prior Publication Data

US 2020/0059992 A1     Feb. 20, 2020

(51) Int. Cl.
| | |
|---|---|
| *H04W 80/10* | (2009.01) |
| *H04W 4/24* | (2018.01) |
| *H04W 28/14* | (2009.01) |
| *H04L 12/14* | (2006.01) |
| *H04W 28/24* | (2009.01) |

(52) U.S. Cl.
CPC ......... *H04W 80/10* (2013.01); *H04L 12/1407* (2013.01); *H04W 4/24* (2013.01); *H04W 28/24* (2013.01)

(58) Field of Classification Search
CPC ..... H04W 80/04; H04W 88/06; H04W 88/08; H04W 84/18; H04L 29/06
USPC .......................................................... 370/328
See application file for complete search history.

(56) References Cited

U.S. PATENT DOCUMENTS

| | | | | |
|---|---|---|---|---|
| 7,653,057 B1 * | 1/2010 | Fromm | ................... | H04L 47/10 370/252 |
| 8,737,221 B1 * | 5/2014 | Jilani | .................. | H04L 47/2416 370/235 |
| 8,743,690 B1 * | 6/2014 | Janarthanan | ............ | H04L 47/31 370/235 |
| 8,792,353 B1 * | 7/2014 | Janarthanan | ............ | H04L 47/10 370/236 |

(Continued)

FOREIGN PATENT DOCUMENTS

| | | |
|---|---|---|
| WO | WO 2018/145669 A1 | 8/2018 |
| WO | WO 2018145669 A1 * | 8/2018 ............ H04W 28/02 |

OTHER PUBLICATIONS

3GPP TS 29.244 v15.0.0 (Dec. 2017), 3rd Generation Partnership Project; Technical Specification Group Core Network and Terminals; Interface between the Control Plane and the User Plane Nodes; Stage 3, (Release 15).*

(Continued)

*Primary Examiner* — Peter G Solinsky
*Assistant Examiner* — Sanjay K Dewan
(74) *Attorney, Agent, or Firm* — Sage Patent Group

(57) ABSTRACT

A method of operating a UPF in a wireless communication system includes receiving a data packet, identifying a PFCP session context associated with the data packet, determining whether a PDR associated with the PFCP session context should be modified or a new PDR should be created, transmitting a request to a session management function to provision a new or modified PDR at the UPF, receiving a session modification response from the SMF provisioning the new or modified PDR for the PFCP session context at the UPF, and applying the new or modified PDR on the data packet.

18 Claims, 7 Drawing Sheets

(56) References Cited

U.S. PATENT DOCUMENTS

| | | | | |
|---|---|---|---|---|
| 10,448,268 B1* | 10/2019 | Jaya | ............... | H04W 24/04 |
| 2010/0008299 A1* | 1/2010 | Shin | ............... | H04W 88/16 |
| | | | | 370/328 |
| 2012/0207086 A1* | 8/2012 | Vihtari | ............... | H04M 15/66 |
| | | | | 370/328 |
| 2014/0269513 A1* | 9/2014 | Yu | ............... | H04L 67/00 |
| | | | | 370/328 |
| 2015/0055566 A1* | 2/2015 | Lin | ............... | H04W 48/20 |
| | | | | 370/329 |
| 2015/0366000 A1* | 12/2015 | Bedekar | ............... | H04W 84/042 |
| | | | | 370/328 |
| 2019/0373666 A1* | 12/2019 | Khan | ............... | H04L 47/34 |
| 2020/0053828 A1* | 2/2020 | Bharatia | ............... | H04W 48/18 |

OTHER PUBLICATIONS

Metaswitch, What is 5G User Plane Function (UPF)?, Jan. 31, 2020.*

Wikipedia, PFCP, Nov. 29, 2019.*

International Search Report and Written Opinion of the International Searching Authority, PCT/EP2019/060899, dated Jun. 19, 2019, 16 pages.

3GPP (3rd Generation Partnership Project; Technical Specification Group Core Network and Terminals; Interface between the Control Plane and the User Plane Nodes; Stage 3 (Release 15), 3GPP TS 29.244 v15.0.0 (Dec. 2017); 157 pages.

* cited by examiner

USER PLANE FUNCTION CONTROL OF CONTROL PLANE-USER PLANE SEPARATION

BACKGROUND

The present disclosure relates generally to communications systems, and more particularly, to communications systems that employ user plane and control plane separation.

The 3GPP evolved packet core (EPC) architecture defines monolithic functional entities that provide various services within a network. For example, in the control plane, these entities include the mobility management entity (MME) for mobility handling and the Policy and Charging Rules Function (PCRF) for policy handling. The 3GPP standard specifies the logical interfaces between different functional entities. Some aspects of the entities, such as resilience and scalability of the entities, are not specified in the standard but are left to vendors as implementation aspects.

The 3GPP 5G core for the control plane follows a different paradigm where the large monolithic functional entities may be split up into smaller network functions. Network functions are connected to each other via a logical communication bus. A network function instance is registered to a network repository function (NRF) function. Using the NRF, a network function instance can find other network function instances to communicate with. FIG. 1 illustrates an example 5G system architecture; see 3GPP TS 23.501 for further details. As shown in FIG. 1, functional entities (e.g., AMF, SMF, etc.) are connected to a logical communication bus. The Access and Mobility Management Function (AMF) communicates with the radio access network (RAN) and one or more user equipments (UE), and the session management function (SMF) communicates with the user plane function (UPF).

The 3GPP specification 29.244 describes how the control plane (CP) is separated from the user plane (UP) and how the CP controls the UP via the N4 interface.

In particular, 3GPP TS 29.244 explains that the CP function controls the packet processing in the UP function by establishing, modifying or deleting PFCP Session contexts and by provisioning (i.e. adding, modifying or deleting) PDRs, FARs, QERs, URRs and/or BAR per PFCP session context." FAR refers to a Forwarding Action Rule, URR refers to a Usage Reporting Rule, QER refers to a QoS Enforcement Rule, and BAR refers to a Buffering Action Rule. A PDR is a packet data rule, while PFCP refers to the Packet Forwarding Control Protocol.

According to 3GPP TS 29.244, a PFCP session context may correspond, for the Evolved Packet Core to an individual Packet Data Network (PDN) connection, a Traffic Detection Function (TDF) session, or a standalone session not tied to any PDN connection or TDF session used e.g. for forwarding Radius, Diameter or DHCP signaling between the Packet Gateway control plane function (PGW-C) and the PDN, and for 5GC, to an individual Protocol Data Unit (PDU) session or a standalone PFCP session not tied to any PDU session.

Each PDR shall contain a Packet Data Information (PDI), i.e. one or more match fields against which incoming packets are matched, and may be associated to the following rules providing the set of instructions to apply to packets matching the PDI:

(a) One FAR, which contains instructions related to the processing of the packets including an Apply Action parameter, which indicates whether the UP function shall forward, duplicate, drop or buffer the packet with or without notifying the CP function about the arrival of a DL packet, and forwarding, buffering and/or duplicating parameters, which the UP function shall use if the Apply Action parameter requests the packets to be forwarded, buffered or duplicated respectively. These parameters may remain configured in the FAR regardless of the Apply Action parameter value, to minimize the changes to the FAR during the transitions of the UE between the idle and connected modes. The buffering parameters, when present, shall be provisioned in a BAR created at the PFCP session level and referenced by the FAR. (Buffering refers here to the buffering of the packet in the UP function. The UP function is instructed to forward DL packets to the CP function when applying buffering in the CP function.)

(b) Zero, one or more QERs, which contains instructions related to the QoS enforcement of the traffic.

(c) Zero, one or more URRs, which contains instructions related to traffic measurement and reporting.

As used herein, a network node for implementing the UP-part is referred to as the User Plane Function (UPF). The UPF may include both PFCP functions that are part of the UPF engine as well as TDF functions (e.g., as described in 3GPP TS 29.212 (protocol), and 3GPP TS 29.213 (flows)).

In the TDF, different service functions may be implemented on the user plan. For traffic that will be subject for additional services, the part of UPF that handles PFCP will send those packets to the TDF for further processing. The packets may be sent using shared memory and zero copying, or via other technologies, such as plain IP-routing.

SUMMARY

A method of operating a user plane function, UPF, in a wireless communication system according to some embodiments includes receiving a data packet from a sending device, identifying a packet forwarding control plane, PFCP, session context associated with the data packet, determining whether a packet detection rule, PDR, associated with the PFCP session context should be modified or a new PDR should be created, transmitting a session modification request to a session management function, SMF, to provision the new PDR or a modified PDR at the UPF, the session modification request describing the new PDR or a modification to an existing PDR, receiving a session modification response from the SMF, the session modification response provisioning the new or modified PDR for the PFCP session context at the UPF, and applying the new PDR or the modified PDR on the data packet.

A potential advantage of this method is that if the control plane has not provisioned a matching PDR for a PFCP session context, or if an existing PDR for the PFCP session context needs to be updated, the UPF may, via UPF logic, send a request to the SMF (or other node handling CP functions) to add a new PDR or to modify an existing PDR that will apply to the PFCP session context. The UPF logic may modify an existing PDR by modifying any FARs, QERs, and/or URRs associated with the existing PDR, as well as by modifying the precedence of the existing PDR. The UPF can thereby exert influence over the PDR that applies to a particular PFCP session context.

The method may further include executing UPF logic for the PDR associated with the PFCP session context after identifying the PFCP session context.

Determining that the PDR associated with the PFCP session context should be added or modified may be performed in response to execution of the UPF logic.

The method may further include performing deep packet inspection on the data packet, and determining that the PDR associated with the PFCP session context should be modified or a new PDR should be added may be performed in response to the deep packet inspection of the data packet.

The PDR may include one or more associated rules, including a Forwarding Action Rule, FAR, a Usage Reporting Rule, URR, a QoS Enforcement Rule, QER, and/or a Buffering Action Rule, BAR.

The session modification request may specify a new or modified Forwarding Action Rule, FAR, Usage Reporting Rule, URR, QoS Enforcement Rule, QER, and/or Buffering Action Rule, BAR of the new or modified PDR associated with the PFCP session context.

The request to provision the new or modified PDR may be sent in a session modification request to the SMF.

The provisioning order from the SMF may be received in a PFCP session modification response from the SMF.

The method may further include generating the new or modified PDR associated with the PFCP session context, and the request to provision the new or modified PDR may include the new or modified PDR.

The method may further include transmitting the data packet to a receiving device after applying the new or modified PDR on the data packet.

A method of operating a control plane node in a wireless communication system according to some embodiments includes receiving a request from a user plane function, UPF, node, to provision a new or modified packet detection rule, PDR, for a data packet received by the UPF, the request describing the new PDR or a proposed modification to an existing PDR, and provisioning the new or modified PDR in the UPF in response to the request.

The method may further include applying policy rules to the new or modified PDR before provisioning the new or modified PDR in the UPF.

The request to provision the new or modified PDR may be received in a PFCP session modification request from the UPF.

The PFCP session modification request may include the new or modified PDR.

The new or modified PDR may include one or more associated rules, including a Usage Reporting Rule, URR, a QoS Enforcement Rule, QER, and/or a Buffering Action Rule, BAR.

A network node of a wireless communication network includes a network interface configured to provide wireless network communication with a wireless terminal, and a processor circuit coupled with the network interface. The processor circuit is configured to provide network communications through the network interface and the processor circuit is configured to perform operations according to any of the foregoing methods.

A network node of a radio access network is adapted to perform according to any of the foregoing methods.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DESCRIPTION OF EMBODIMENTS

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
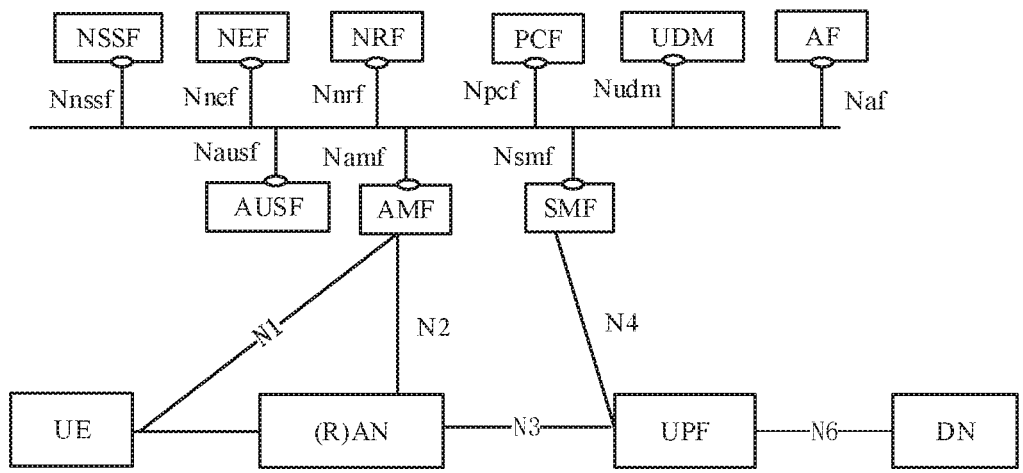
FIG. 1 is a block diagram illustrating a service based architecture for a wireless communication network.
Figure 2:
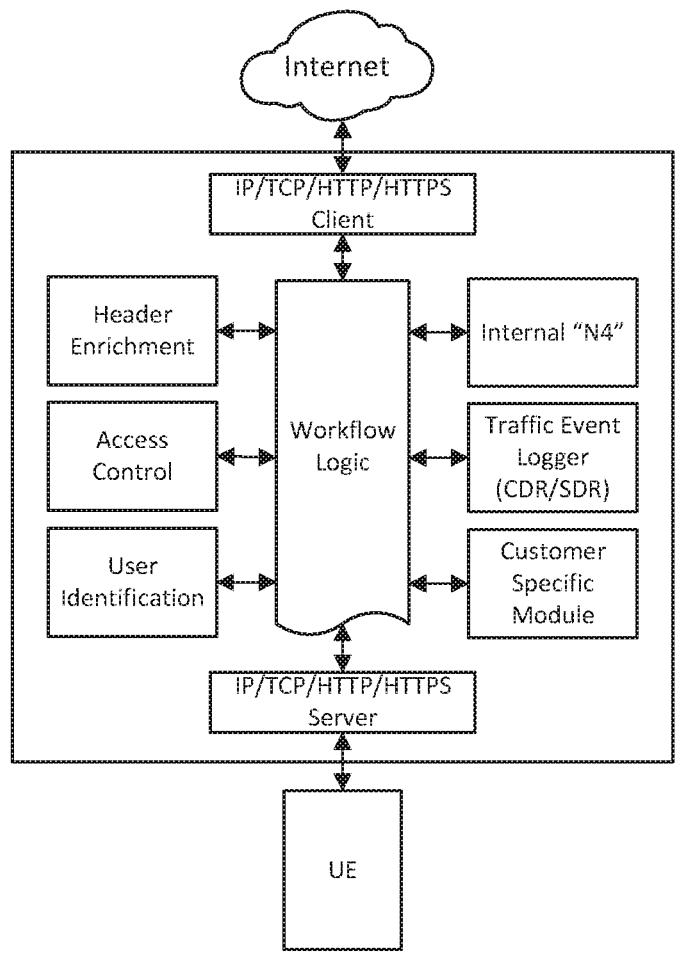
FIGS. 2 and 3 illustrate a processing architecture that may be employed in a user plane function in accordance with some embodiments of inventive concepts.

According to some embodiments, a processing architecture, which may be referred to as a Multi-Service Proxy (MSP) may be employed in the UPF-TDF for rapid development and deployment of new services. For increased flexibility, the processing architecture may be a script-based architecture, and embodiments described herein are described in connection with a script-based approach. However, it will be appreciated that non-script based, e.g., static, code may be employed in some embodiments. A suitable processing architecture is shown in FIG. 2. As shown therein, using this architecture, a workflow logic operates between a UE and a packet data network, such as the Internet, to perform various functions. The logic presents an interface as a server to the UE and a client to the Internet. A workflow logic may be used to develop new user plane service and it uses of a set of APIs to accomplish this. The APIs are part of the UPF-TDF. An example of APIs that may be used in the TDF are header enrichment, access control, user identification, Service Based Interfaces (SBIs) to other network function nodes, etc.

Figure 3:
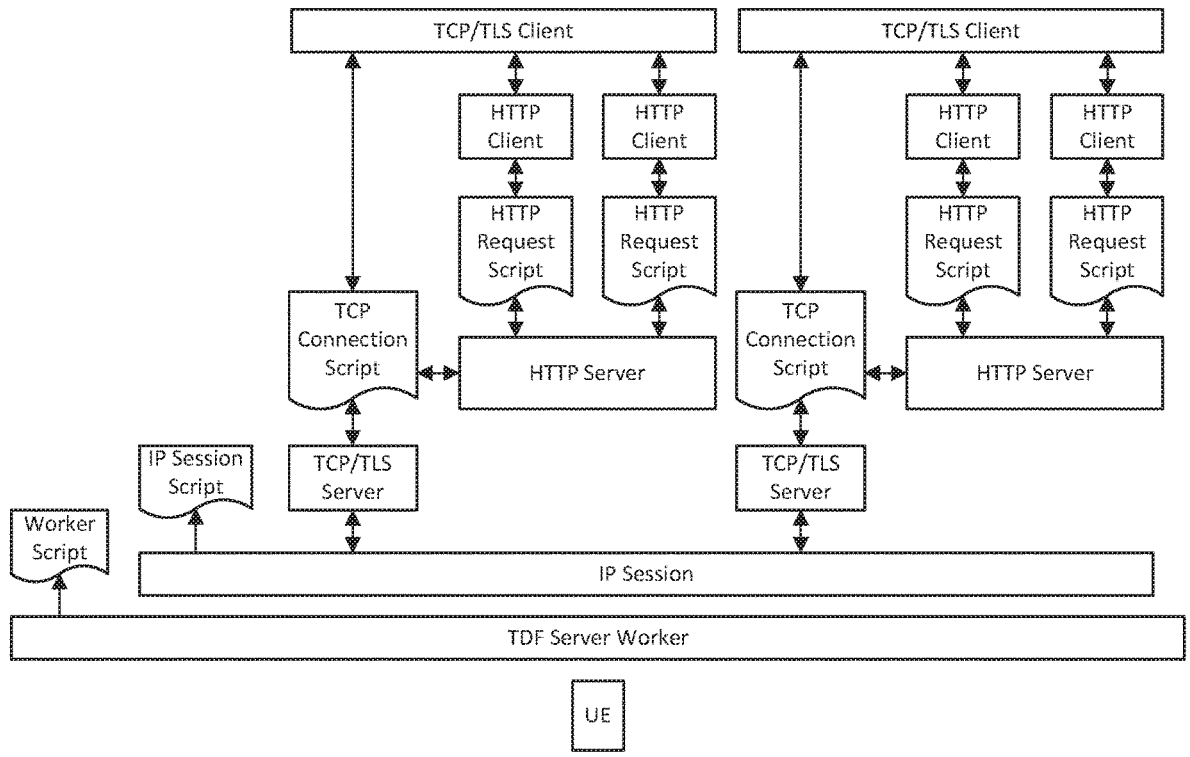

New APIs or extended APIs may be introduced/updated via UPF-TDF releases. The use of those APIs via script may be done without the need to re-compile and re-link the UPF-TDF node. The script may be developed in JavaScript outside the UPF-TDF and then sent to the UPF-TDF from a central location. Depending on type of script, the script may be called from either session start, IP, TCP or HTTP. FIG. 3 illustrates various different scripts in the TDF part of the UPF, including a worker script that interfaces with a TDF session worker, an IP session script that interfaces with an IP session, one or more TCP connection scripts that interface with TCP/TLS clients and servers, and one or more HTTP request scripts. The worker script performs initialization of customer specific thread-global parameters at start-up or parameter change. The IP session script specifies what the TDF must do when the first connection is received from a certain IP address, and specifies how the proxy must validate that the IP address, which is connected to the session, is still allocated to the same subscriber that started the session. The TCP connection script specifies how the proxy should handle a TCP connection, and the HTTP request script specifies how the proxy should handle an HTTP request.

The scripting architecture allows flexibility to build new services beyond pre-configured services. In some cases, the script may interact with other nodes using predefined APIs. A desired outcome of the interaction might be that a particular service should be zero-rated (i.e., made free of charge). Another desired outcome may be that data packets for a particular service will be shaped down to a new bitrate.

Figure 4:
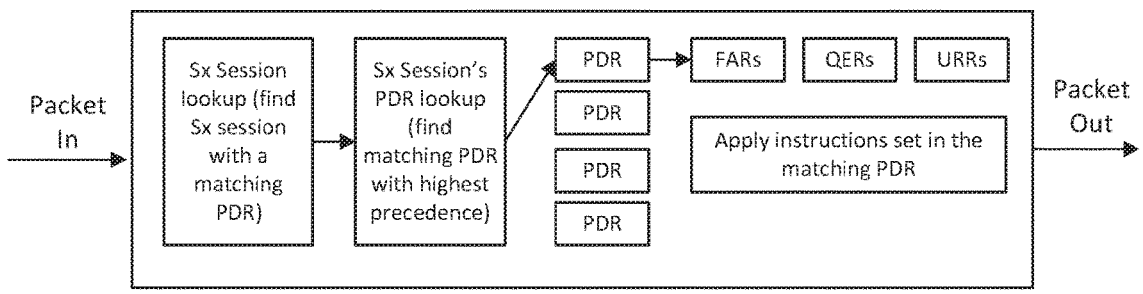
FIG. 4 illustrates operations of a user plane function to select and apply a packet data rule.

As noted in 3GPP TS 29.244, on receipt of a user plane packet, the UP function identifies the PFCP session to which the packet corresponds and performs a lookup of the provisioned PDRs associated with the PFCP session context. The UP function finds the first PDR matching the incoming packet, among all the PDRs provisioned for the PFCP session context, starting with the PDRs with the highest precedence and continuing then with PDRs in decreasing order of precedence. Only the highest precedence PDR matching the packet is selected. That is, the UP function may stop the PDR lookup once a matching PDR is found. The UP function may drop packets that are unmatched by any PDRs. This process is illustrated in FIG. 4. As shown therein, when a matching PDF is found, the UP function applies the FARs, QERs and URRs specified in the PDR to the incoming packet before forwarding the packet to a receiver.

According to some embodiments, if the CP has not provisioned a matching PDR (other than, for example, a default PDR), including FARs, QERs, and URRs, for the PFCP session context, the UPF may send a request to the SMF (or other node handling CP functions) over the N4 interface to add a new PDR or to modify an existing PDR that will apply to the PFCP session context. The script may modify an existing PDR by modifying any FARs, QERs, and/or URRs associated with the existing PDR, as well as by modifying the precedence of the existing PDR.

The SMF, after approval of the request, will provision a new PDR, including FARs, QERs and URRs in the UPF. The new PDR will have the desired capability requested by the UPF, such as, for example, a URR supporting zero-rate, a QER supporting shaping etc.

Accordingly, in some embodiments, the UPF can use local policies, executed in scripts, and tailor FARs, URRs and QERs for a specific flow for a user. New PDRs and associated services can be created, and existing PDRs and associated services (e.g., FARs) can be modified at the request of the UPF. This may be achieved without changing the pre-configuration of the UPF. As the SMF ultimately provisions the new or modified PDRs, the SMF can exert its policy control enforcement role over the new or modified PDRs.

Figure 5:
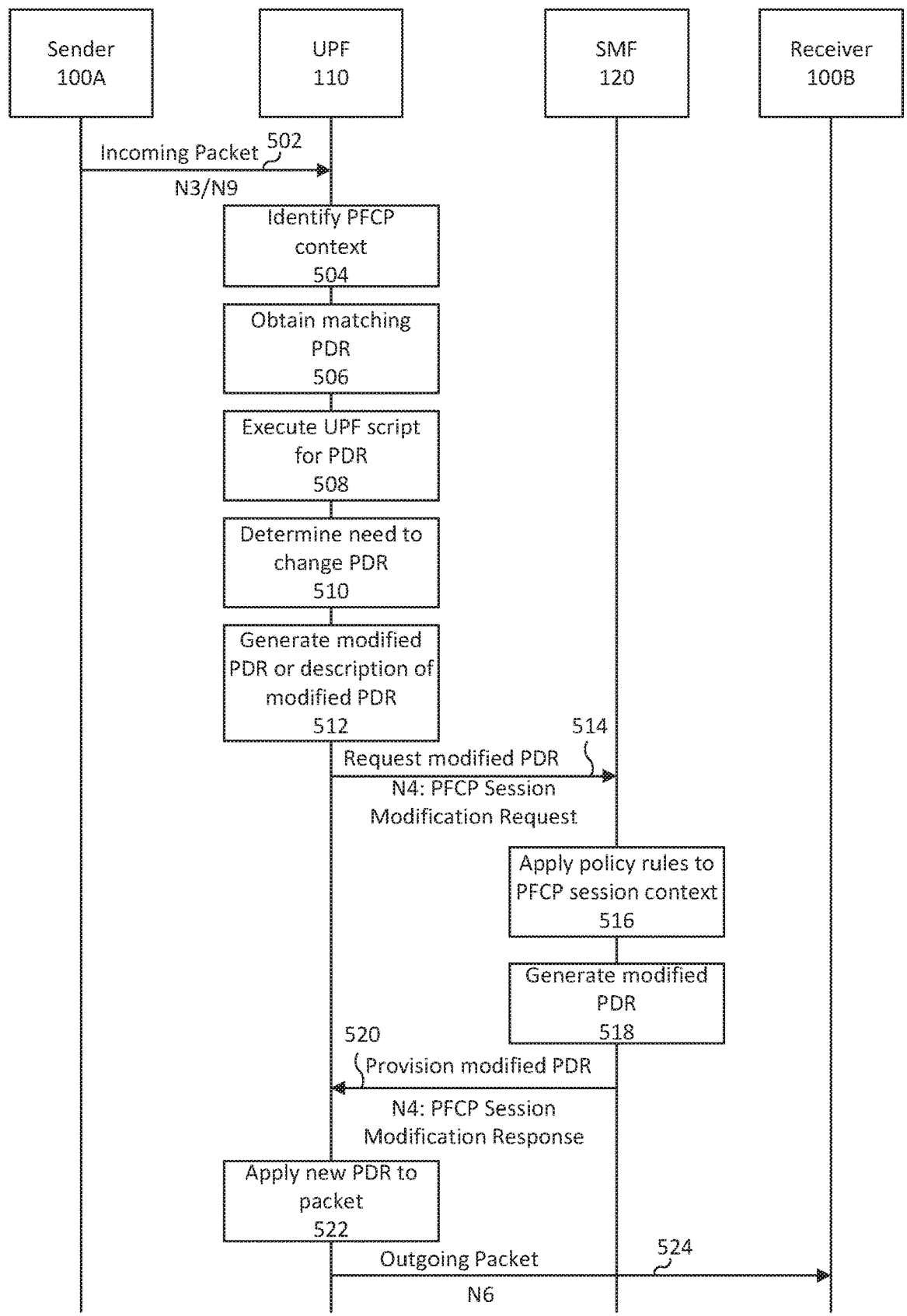
FIGS. 5 and 6 are flow diagrams illustrating message flows and operations in a service-based architecture according to some embodiments of inventive concepts.

Referring to FIG. 5, an example of a modification of an existing PDR is shown by way of a flow diagram illustrating various messages transmitted/received between a UPF and an SMF, and various operations performed by the UPF and SMF. Referring to FIG. 5, operations begin when a UPF 110 receives an incoming packet 502 on the N3/N9 interface from a sender 100A. When the incoming packet is received, the UPF 110 first identifies the PFCP session context associated with the data packet (block 504). The UPF 110 then searches for any PDR matching the PFCP session context (block 506) and, if a UPF service script corresponding to the PDR exists, calls the UPF service script (block 508).

The UPF service script may run FARs, URRs, QORs and/or other rules associated with the PFCP session context. In some cases, the UPF script may determine that it is desirable to change the PDR (block 510) and associated FARs (such as to add Gi service functions), URRs (e.g. to include zero rating) and/or QERs (e.g. mapping to different QoS flow) associated with the PDR. The requested change to the PDR or its associated FARs, URRs and QERs is provided to the SMF 120 using the PFCP Session Modification procedure. The UPF 110 may then generate the modified PDR or a description of the modifications to the existing PDR (block 512). The modified PDR or a description of the requested changes to the PDR are included or described in a PFCP Session Modification Request 514 sent by the UPF 110 on the N4 interface. The UPF script can be executed at any time. For example, the first matching PDR (with associated FAR, URR and QER) may send packets to a traffic detection function (TDF). The TDF can, via script, deep packet inspection, etc., conclude that a new PDR is needed for the flow and order it from SMF.

The SMF 120 applies policy rules for the PFCP session context to the proposed modification to the PDR (block 516), and generates a modified PDR (block 518) that complies with the policy rules. The policy rules, which may be pre-configured at the SMF 120, may limit or control the types of rules a PDR for the PFCP session context in question may provide.

The SMF then provisions the modified PDR at the UPF 110 using the PFCP Session Modification Procedure by sending a PFCP session modification response message 520 to the UPF 110 over the N4 interface. The provisioned PDR and associated rules may then be applied on the incoming packet by the UPF 110 (block 522). As a result, the UPF 110 may forward the packet to a receiver 100B in a message 524 over the N6 interface.

Figure 6:
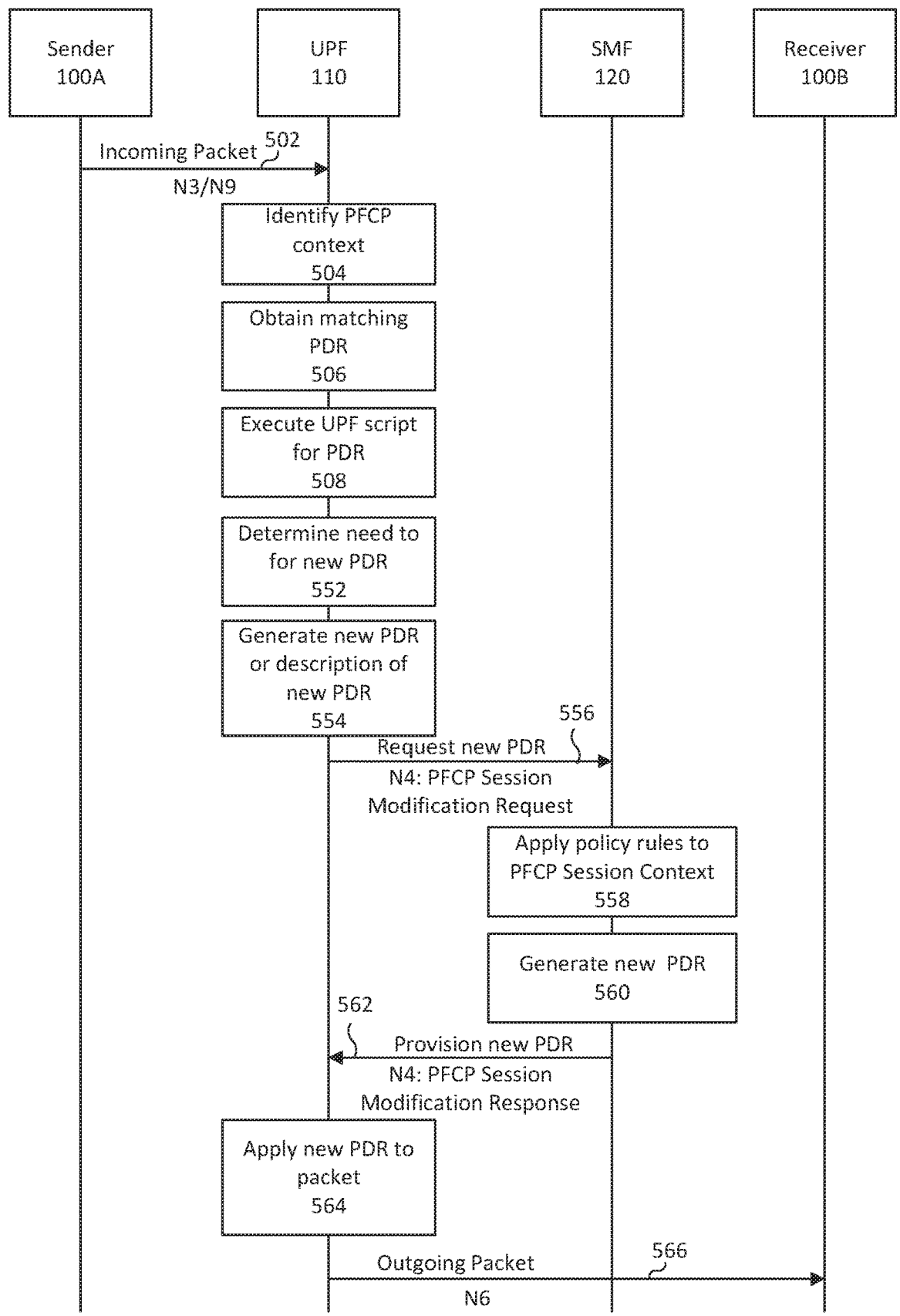

FIG. 6 illustrates an example of the creation of a new PDR for a PFCP session context. Referring to FIG. 6, operations begin when a UPF 110 receives an incoming packet 502 on the N3/N9 interface from a sender 100A. When the incoming packet is received, the UPF 110 first identifies the PFCP session context associated with the data packet (block 504). The UPF 110 then searches for any PDR matching the PFCP session context (block 506) and, if a UPF service script corresponding to the PDR exists, calls the UPF service script (block 508).

The UPF service script may run FARs, URRs, QORs and/or other rules associated with the PFCP session context. In some cases, the UPF script may determine that it is desirable to add a new PDR (block 552) and associated rules, rather than modifying an existing PDR.

The UPF 110 may then generate the new PDR or a description of the new PDR (block 554). The UPF 110 then requests the new PDR and its associated FARs, URRs and QERs by sending a PFCP session modification request 556 to the SMF 120 on the N4 interface using the PFCP Session Modification procedure. The UPF 110 may include the new PDR in the PFCP Session Modification Request 556. In some embodiments, the PFCP Session Modification Request 556 may only describe the new PDR and its associated rules.

The SMF 120 applies policy rules for the PFCP session context to the proposed modification to the PDR (block 558), and generates a new PDR (block 560) that complies with the policy rules.

The SMF 120 then provisions the new PDR at the UPF 110 using the PFCP Session Modification Procedure by sending a PFCP session modification response message 562 to the UPF 110 over the N4 interface. The provisioned PDR and associated rules may then be applied on the incoming packet by the UPF 110 (block 564). As a result, the UPF 110 may forward the packet to a receiver 100B in a message 566 over the N6 interface.

Figure 7A:
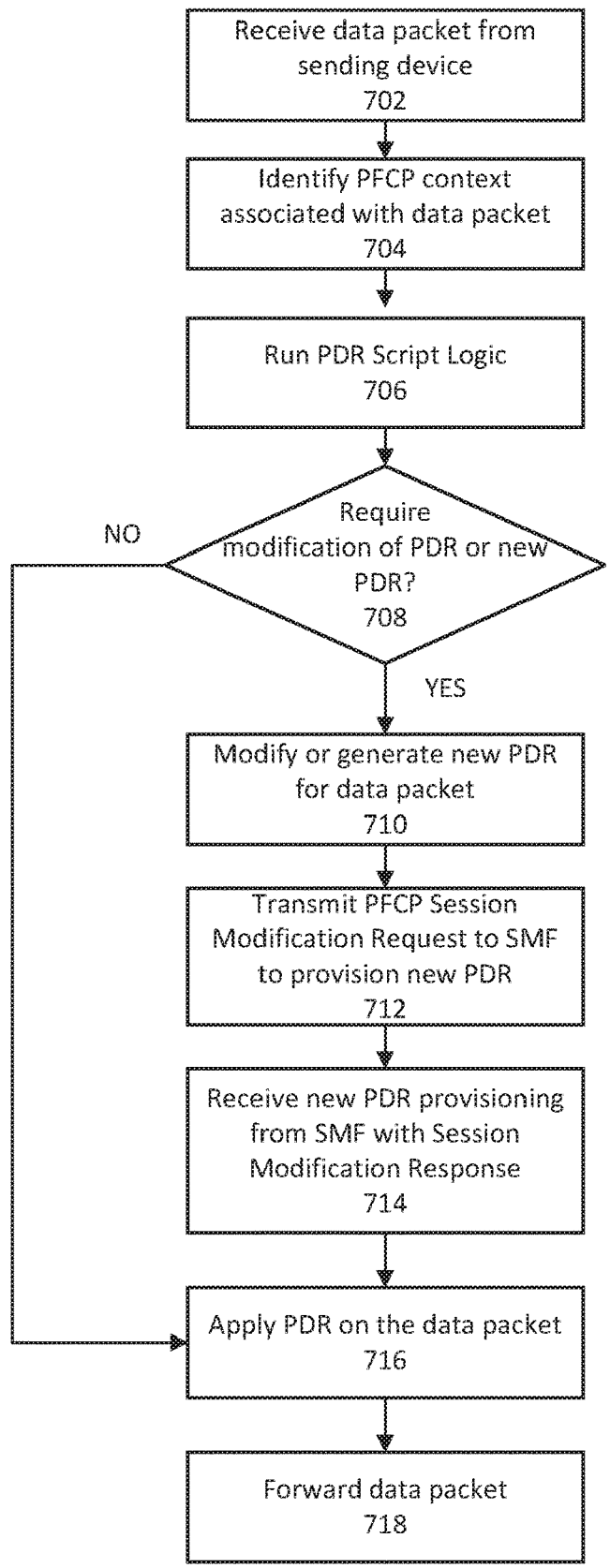
FIGS. 7A and 7B are flow charts illustrating operations of network nodes according to some embodiments of inventive concepts.

FIG. 7A illustrates operations of a node providing the user plane function according to some embodiments. Referring to FIG. 7A, the UPF 110 receives a data packet from a sending device, such as a UE in a wireless communication network that has an active PFCP session context (block 702). In general, the UPF handles data traffic flows from UEs in the network. A control plane function, such as an SMF, provides rules for how the UPF should handle a given packet. For example, the SMF provides rules that define what QoS should be applied to the packet, what charging or reporting rules should be applied to the packet, etc. The rules may be provided in a PDR, and may include QERs, BARs, URRs, etc. The rules may be applied by the UPF via execution of a script. Accordingly, when a packet is received, the UPF 110 identifies a PFCP session context associated with the data packet based on the source IP address (block 704) and then executes PDR script logic associated with the PFCP session context (block 706). The associated rules (e.g., FAR, URR and QER) will be applied to the by the UPF. However, the TDF (based on script operation, DPI, etc.) may also order a changed/new PDR to be applied on the flow. For example, the UPF can change the PDR when applying a first PDR, and the TDF (which is part of the UPF) can also modify/add a new PDR once it receives IP-packets and determines that a new or modified PDR is needed.

The PDR script logic may provide deep packet inspection (DPI) of the data packet to determine, for example, what type of service the packet is associated with (e.g., VoIP, DVB) or what application the packet is associated with (e.g., YouTube, Facebook, etc.). Based on execution of the PDR script logic and/or DPI, the UPF 110 may determine that there is a need to modify an existing PDR or add a new PDR to handle packets in the PFCP session context (block 708). If a modification of an existing PDR or a new PDR is needed, the UPF 110 may proceed to generate the new or modified PDR for the data packet (block 710) and then transmit a Session Modification Request to the SMF 120 requesting the SMF to provision the new or modified PDR (block 712). The Session Modification Request may include the new or modified PDR or describe the new or modified PDR.

The UPF 120 then receives a Session Modification Response from the SMF 120 that provisions the new or modified PDR at the UPF 110 (block 714). The UPF 110 then applies the new or modified PDR to the data packet (block 716) and forwards the data packet to a receiver (block 718).

In determining that a new or modified PDR is needed for a particular packet flow, the UPF 110 can use information it has about, for example, device capabilities of the sending device, requirements, limitations or features of the service or application that applies to the packet flow, or other information. For example, a UPF 110 may determine based on deep packet inspection that the data flow associated with the packet is used for vehicle-to-vehicle communications and requires a certain QoS for safety reasons. If the UPF determines that there is no PDR provisioned specifically for such communications, it can request the SMF to provision a PDR that contains rules that meet the requirements of the service.

In making the determination that a new or modified PDR is needed, the UPF 110 can also, based on executing the PDR script logic, access one or more local or external databases to obtain information that is relevant to the processing needs of the packet, such as weather databases, traffic databases, etc. Such databases may be provided by third party services and/or by the network.

Moreover, because the UPF 110 requests provisioning of the new or modified PDR from the SMF 120, the control plane has full awareness of what PDRs are being applied to the packet flows by the UPF 110.

Figure 7B:
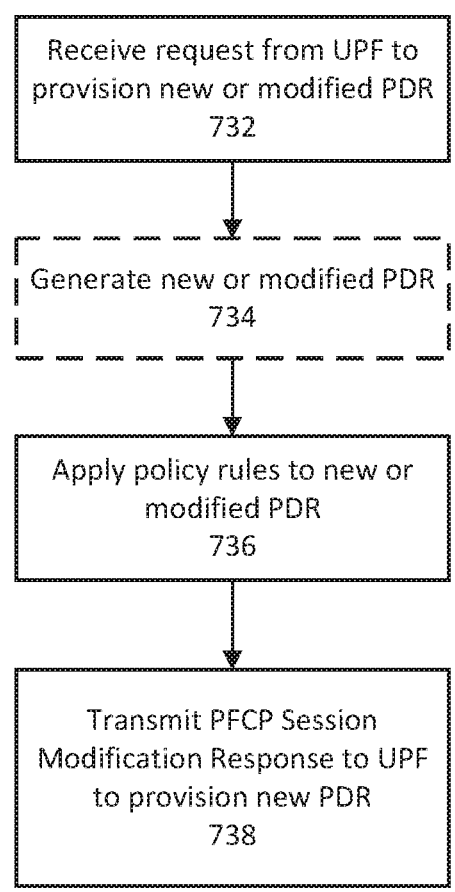
Figure 8:
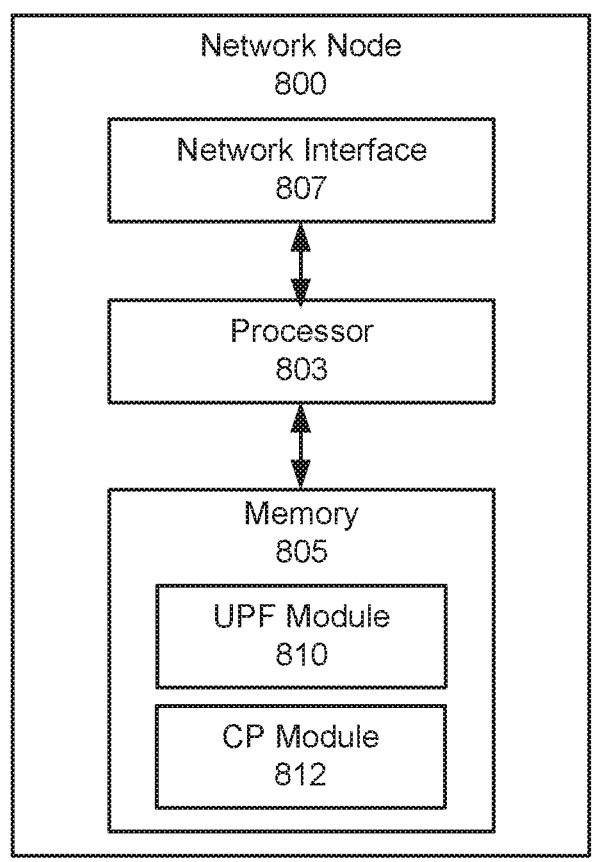
FIG. 8 is block diagram illustrating features of a network node that implements a user plane function or a control plane function according to some embodiments of inventive concepts.

FIG. 7B illustrates operations of a control plane node, such as an SMF 120. Referring to FIG. 7B, an SMF 120 may receive a request from a UPF 110 to modify an existing PDR or create a new PDR. The request, which may be in the form of a PFCP Session Modification Request, may include the new or modified PDR or a description of the new or modified PDR.

If the new or modified PDR is not provided by the UPF 110, the SMF 120 may then generate the new or modified PDR (block 734). Prior to provisioning the PDR, the SMF 120 may apply one or more policy rules to the new or modified PDR to ensure that the rules provided in the new or modified PDR fall within acceptable boundaries (block 736). After application of the policy rules, the SMF 120 then provisions the new or modified PDR at the UPF 110 by sending a PFCP Session Modification Response to the UPF 110 specifying the new or modified PDR (block 738).

Explanations for Abbreviations from the Above Disclosure are Provided Below

| Abbreviation | Explanation |
| --- | --- |
| AF | Application Function |
| AMF | Access and Mobility Management Function |
| AN | Access Network |
| API | Application Programming Interface |
| AUSF | Authentication Server Function |
| BAR | Buffering Action Rule |
| CP | Control Plane |
| DN | Data Network |
| DPI | Deep Packet Inspection |
| DVB | Digital Video Broadcasting |
| EPC | Evolved Packet Core |
| FAR | Forwarding Action Rule |
| HTTP | Hypertext Transport Protocol |
| IP | Internet Protocol |
| MME | Mobility Management Entity |
| MSP | Multi-Service Proxy |
| NSSF | Network Slice Selection Function |
| NRF | Network Repository Function |
| NEF | Network Exposure Function |
| PCF | Policy Control Function |
| PCRF | Policy and Charging Rules Function |
| PDI | Packet Data Information |
| PDN | Packet Data Network |
| PDR | Packet Data Rule |
| PDU | Protocol Data Unit |
| PFCP | Packet Forwarding Control Protocol |
| PGW-C | Packet Gateway - Control Plane |
| QER | QoS Enforcement Rule |
| QoS | Quality of Service |
| RAN | Radio Access Network |
| SBI | Service Based Interface |

| Abbreviation | Explanation |
|---|---|
| SMF | Session Management Function |
| TCP | Transmission Control Protocol |
| TDF | Traffic Detection Function |
| TLS | Transport Layer Security |
| UDM | Unified Data Management |
| UE | User Equipment |
| UP | User Plane |
| UPF | User Plane Function |
| URR | Usage Reporting Rule |
| VoIP | Voice Over IP |

Citations for References from the Above Disclosure are Provided Below

Reference [1]: 3GPP TS 29.244
Reference [2]: 3GPP TS 23.501
Reference [3]: 3GPP TS 29.212
Reference [4]: 3GPP TS 29.213

Further Definitions and Embodiments are Discussed Below

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pica base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Processing circuitry 803 is configured to perform any determining, calculating, or similar operations (e.g., certain obtaining operations) described herein as being provided by a network node. These operations performed by processing circuitry 803 may include processing information obtained by processing circuitry 803 by, for example, converting the obtained information into other information, comparing the obtained information or converted information to information stored in the network node, and/or performing one or more operations based on the obtained information or converted information, and as a result of said processing making a determination.

Processing circuitry 803 may comprise a combination of one or more of a microprocessor, controller, microcontroller, central processing unit, digital signal processor, application-specific integradted circuit, field programmable gate array, or any other suitable computing device, resource, or combination of hardware, software and/or encoded logic operable to provide, either alone or in conjunction with other network node components, such as device readable medium, network node functionality. For example, processing circuitry 803 may execute instructions stored in device readable medium or in memory within processing circuitry 803. Such functionality may include providing any of the various wireless features, functions, or benefits discussed herein. In some embodiments, processing circuitry 803 may include a system on a chip (SOC).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method of operating a user plane function, UPF, node in a wireless communication system, comprising:
   receiving a data packet from a sending device;
   identifying a packet forwarding control plane, PFCP, session context associated with the data packet;
   determining an existing packet detection rule, PDR, associated with the PFCP session context should be modified for the PFCP session context to process the data packet within the PFCP session context;
   transmitting a session modification request toward a session management function, SMF, to modify the existing PDR at the UPF node, wherein the session modification request transmitted by the UPF node describes a modification to the existing PDR to process the data packet within the PFCP session context;
   receiving a session modification response from the SMF, the session modification response provisioning the modified existing PDR as described in the session modification request for processing the data packet within the PFCP session context at the UPF node; and
   applying the modified existing PDR on the data packet to process the data packet within the PFCP session context.

2. The method of claim 1, further comprising:
   executing UPF logic for the existing PDR associated with the PFCP session context after identifying the PFCP session context.

3. The method of claim 2, wherein determining that the existing PDR associated with the PFCP session context should be modified for the PFCP session context is performed in response to execution of the UPF logic.

4. The method of claim 1, further comprising:
   performing deep packet inspection on the data packet, wherein determining that the existing PDR associated with the PFCP session context should be modified for the PFCP session context is performed in response to the deep packet inspection of the data packet.

5. The method of claim 1, wherein the existing PDR comprises one or more associated rules, including a Forwarding Action Rule, FAR, a Usage Reporting Rule, URR, a QoS Enforcement Rule, QER, and/or a Buffering Action Rule, BAR.

6. The method of claim 1, wherein the session modification request specifies a modified Forwarding Action Rule, FAR, Usage Reporting Rule, URR, QoS Enforcement Rule, QER, and/or Buffering Action Rule, BAR of the modified existing PDR associated with the PFCP session context.

7. The method of claim 1, wherein the session modification response from the SMF comprises a PFCP session modification response from the SMF.

8. The method of claim 1, further comprising:
   generating the modified existing PDR associated with the PFCP session context, wherein the request to provision the modified existing PDR comprises the modified existing PDR.

9. The method of claim 1, further comprising:
   transmitting the data packet to a receiving device after applying the modified existing PDR on the data packet.

10. The method of claim 1, wherein determining that the existing packet detection rule, PDR, associated with the PFCP session context should be modified comprises determining that the existing packet detection rule, PDR, associated with the PFCP session context should be modified further based on device capabilities of the sending device or one or more of requirements, limitations, or features of the identified at least one of the application or the type of service associated with the data packet.

11. A network node adapted to provide a user plane function, UPF, node in a wireless communication network, comprising:
    a network interface configured to provide wireless network communication with a wireless terminal; and
    a processor circuit coupled with the network interface, wherein the processor circuit is configured to provide network communications through the network interface and wherein the processor circuit is configured to perform operations comprising:
    receiving a data packet from a sending device;
    identifying a packet forwarding control plane, PFCP, session context associated with the data packet;
    determining an existing packet detection rule, PDR, associated with the PFCP session context should be modified for the PFCP session context to process the data packet within the PFCP session context;
    transmitting a session modification request toward a session management function, SMF, to modify the existing PDR at the UPF node, wherein the session modification request transmitted by the UPF node describes a modification to the existing PDR to process the data packet within the PFCP session context;
    receiving a session modification response from the SMF, the session modification response provisioning the modified existing PDR as described in the session modification request for processing the data packet within the PFCP session context at the UPF node; and
    applying the modified existing PDR on the data packet to process the data packet within the PFCP session context.

12. The network node of claim 11, wherein the processor circuit is further configured to execute UPF logic for the existing PDR associated with the PFCP session context after identifying the PFCP session context.

13. A method of operating a control plane node in a wireless communication system, comprising:
    receiving a session modification request from a user plane function, UPF, node, to modify an existing PDR for a data packet received by the UPF node, wherein the session modification request received from the UPF node describes a proposed modification to the existing PDR to process the data packet within the PFCP session context;
    modifying the existing PDR based on the proposed modification described in the session modification request received from the UPF node; and provisioning the modified existing PDR in the UPF node in response to the request to process the data packet within the PFCP session context.

14. The method of claim 13, further comprising:
applying policy rules to the modified existing PDR before provisioning the new or modified existing PDR in the UPF node.

15. The method of claim 13, wherein the session modification comprises a PFCP session modification request from the UPF node.

16. The method of claim 15, wherein the PFCP session modification request includes the modified existing PDR.

17. The method of claim 13, wherein the modified existing PDR comprises one or more associated rules, including a Forwarding Action Rule, FAR, a Usage Reporting Rule, URR, a QoS Enforcement Rule, QER, and/or a Buffering Action Rule, BAR.

18. A network node adapted to provide a control plane, CP, function in a wireless communication network, comprising:

a network interface configured to provide wireless network communication with a wireless terminal; and
a processor circuit coupled with the network interface, wherein the processor circuit is configured to provide network communications through the network interface and wherein the processor circuit is configured to perform operations comprising:
receiving a session modification request from a user plane function, UPF, node, to modify an existing PDR for a data packet received by the UPF node, wherein the session modification request received from the UPF node describes a proposed modification to the existing PDR to process the data packet within the PFCP session context;
modifying the existing PDR based on the proposed modification described in the session modification request received from the UPF node; and
provisioning the modified existing PDR in the UPF node in response to the request to process the data packet within the PFCP session context.

* * * * *